(12) United States Patent
Nichols et al.

(10) Patent No.: US 7,588,412 B2
(45) Date of Patent: Sep. 15, 2009

(54) COOLED SHROUD ASSEMBLY AND METHOD OF COOLING A SHROUD

(75) Inventors: Glenn Herbert Nichols, Mason, OH (US); Duane Allan Busch, Loveland, OH (US)

(73) Assignee: General Electric Company, Schenectady, NY (US)

( * ) Notice: Subject to any disclaimer, the term of this patent is extended or adjusted under 35 U.S.C. 154(b) by 402 days.

(21) Appl. No.: 11/161,275

(22) Filed: Jul. 28, 2005

(65) Prior Publication Data

US 2007/0025836 A1    Feb. 1, 2007

(51) Int. Cl.
*F01D 9/06* (2006.01)
(52) U.S. Cl. .......................... 415/1; 415/116; 415/173.1
(58) Field of Classification Search ............... 415/1, 415/173.1, 175, 176, 116, 173.2, 173.3, 177, 415/178
See application file for complete search history.

(56) References Cited

U.S. PATENT DOCUMENTS

| | | | | |
|---|---|---|---|---|
| 4,157,232 A | * | 6/1979 | Bobo et al. | 415/116 |
| 4,869,640 A | * | 9/1989 | Schwarz et al. | 415/115 |
| 5,048,288 A | * | 9/1991 | Bessette et al. | 60/226.1 |
| 5,071,313 A | * | 12/1991 | Nichols | 415/134 |
| 5,165,847 A | * | 11/1992 | Proctor et al. | 415/115 |
| 5,167,487 A | * | 12/1992 | Rock | 415/173.3 |
| 6,139,257 A | | 10/2000 | Proctor et al. | |
| 6,354,795 B1 | | 3/2002 | White et al. | |

* cited by examiner

*Primary Examiner*—Christopher Verdier
(74) *Attorney, Agent, or Firm*—Adams Intellectual Property Law, P.A.; Stephen Friskney (57) ABSTRACT

A cooled shroud assembly for a gas turbine engine having a longitudinal centerline includes at least one arcuate shroud segment surrounding a row of rotating turbine blades. The shroud segment has a forward flange, an aft flange defining an axially-facing aft edge, and an inwardly-facing flowpath surface, and the shroud segment lacks cooling holes for cooling the aft flange or the aft edge. At least one stationary turbine nozzle is disposed axially next to the shroud segment and includes an airfoil-shaped airfoil and an arcuate outer band disposed at a radially outer end of the airfoil and positioned axially adjacent to the shroud. At least one cooling hole is formed in the outer band in fluid communication with a source of cooling air. The cooling hole is positioned so as to direct a flow of cooling air against the shroud segment.

18 Claims, 6 Drawing Sheets

COOLED SHROUD ASSEMBLY AND METHOD OF COOLING A SHROUD

BACKGROUND OF THE INVENTION

This invention relates generally to gas turbine components, and more particularly to cooled turbine shrouds.

Components of a gas turbine engine, for example stationary shrouds or shroud segments and their supporting structures, are exposed to a heated stream of combustion gases. It is desirable to operate a gas turbine engine at high temperatures most efficient for generating and extracting energy from these gases. However, such elevated temperatures frequently exceed the temperature capability of the basic component materials and can result in compromise of mechanical and/or physical properties, or distortion of the components. Consequently, use has been made of various heat-resistant coatings and/or cooling processes. If cooling is used, is it usually implemented by channeling relatively cooler air, for example from various points in the high-pressure compressor of the engine, and discharging it within or from a component to provide convection, impingement, or film cooling.

In some turbine configurations, a "bow wave" flow structure created by flow over a nozzle structure causes localized "hot spots" on an upstream shroud. Because the extraction of cooling flow reduces engine performance, it is known to apply film cooling selectively to those local hot spots only.

However, in certain situations this preferential cooling method is not effective. In some turbine configurations, the difference in part count between a row of shroud segments and the downstream nozzle segments staggers the location of the "bow wave" adjacent each shroud, making localized cooling of the shroud ineffective. This situation would instead require a row of film cooling holes distributed over the entire shroud segment to yield the same shroud durability protection. This would demand more cooling flow, and thus reduce engine performance. Furthermore, some shrouds incorporate a Thermal Barrier Coating (TBC) on their flowpath surfaces. The drilling of a cooling hole in this surface may ruin the TBC integrity.

Accordingly, there is a need for a turbine shroud which is efficiently cooled without the use of cooling holes therein.

BRIEF SUMMARY OF THE INVENTION

The above-mentioned need is met by the present invention, which according to one aspect provides a cooled shroud assembly for a gas turbine engine having a longitudinal centerline. The shroud assembly includes at least one arcuate shroud segment surrounding a row of rotating turbine blades, the shroud having a forward flange, an aft flange defining an axially-facing aft edge, and an inwardly-facing flowpath surface. The shroud segment lacks cooling holes for cooling the aft flange or the aft edge. At least one stationary turbine nozzle is disposed axially next to the shroud segment and has an airfoil; and an arcuate outer band disposed at a radially outer end of the airfoil and positioned axially adjacent to the shroud. At least one cooling hole is formed in the outer band in fluid communication with a source of cooling air. The hole is positioned so as to direct a flow of cooling air against the shroud segment.

According to another aspect of the invention, a method of cooling a shroud for a gas turbine engine includes providing at least one arcuate shroud segment surrounding a row of rotating turbine blades, the shroud having a forward end, an aft flange defining and aft edge, and an inwardly-facing flowpath surface, wherein the aft flange lacks cooling holes; providing at least one stationary turbine nozzle disposed axially next to the shroud segment, the nozzle including an airfoil-shaped airfoil; and an arcuate outer band disposed at a radially outer end of the airfoil and disposed axially next to the shroud, the outer band defining a nozzle plenum, wherein gas flow over the airfoil generates a bow wave which causes localized heating of a portion of the aft flange; and directing a flow of cooling air from the nozzle plenum to the aft edge of the shroud segment so as to substantially negate the localized heating.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
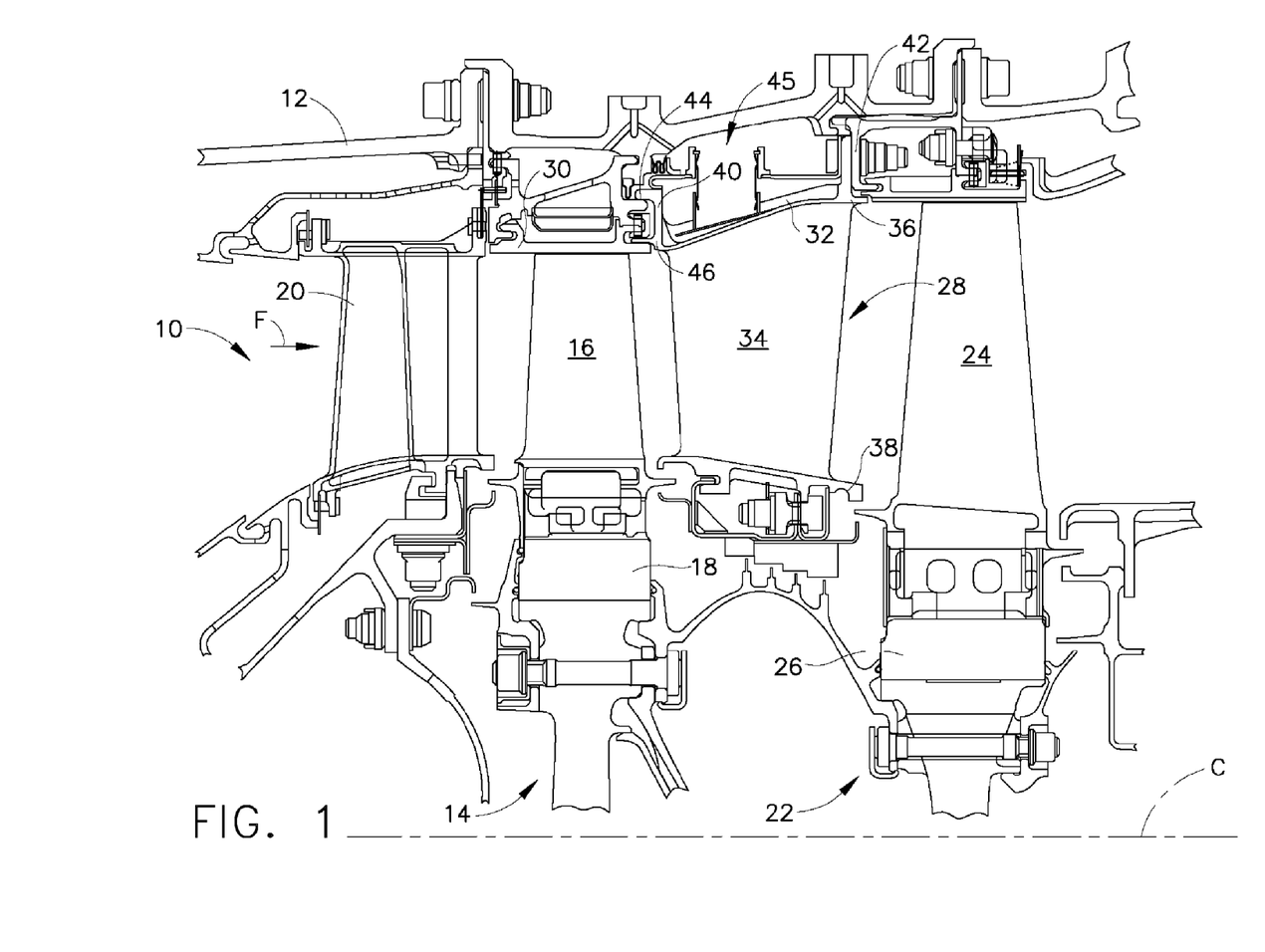
FIG. 1 is a cross-sectional view of an exemplary gas turbine engine incorporating the shroud assembly of the present invention.

Referring to the drawings wherein identical reference numerals denote the same elements throughout the various views, FIG. 1 illustrates a portion of a high-pressure turbine (HPT) 10 of a gas turbine engine. the HPT 10 includes a number of turbine stages disposed within an engine casing 12. As shown in FIG. 1, the HPT 10 has two stages, although different numbers of stages are possible. The first turbine stage includes a first stage rotor 14 with a plurality of circumferentially spaced-apart first stage blades 16 extending radially outwardly from a first stage disk 18 that rotates about the centerline axis "C" of the engine, and a stationary first stage turbine nozzle 20 for channeling combustion gases into the first stage rotor 14. The second turbine stage includes a second stage rotor 22 with a plurality of circumferentially spaced-apart second stage blades 24 extending radially outwardly from a second stage disk 26 that rotates about the centerline axis of the engine, and a stationary second stage nozzle 28 for channeling combustion gases into the second stage rotor 22. A plurality of arcuate shroud segments 30, described in more detail below, are arranged circumferentially in an annular array so as to closely surround the first stage blades 16 and thereby define the outer radial flowpath boundary for the hot combustion gases flowing through the first stage rotor 14.

The second stage turbine nozzle 28 includes a plurality of nozzle segments 32 each having an airfoil 34 supported between an arcuate outer band 36 and arcuate inner band 38. The nozzle segments 32 are arranged to collectively form a complete 360° assembly. The airfoils 34 are configured so as to optimally direct the combustion gases to the downstream second stage rotor 18. The outer and inner bands 36 and 38 of each nozzle segment 32 define outer and inner radial boundaries, respectively, of the primary gas flowpath "F" through the second stage nozzle 28. The outer band 36 has forward and aft flanges 40 and 42, respectively. The forward flange 40 carries an axially-extending forward rail 44, which is used to mount the nozzle segment 32 to the engine casing 12, and an axially-extending arcuate discourager lip 46, sometimes referred to as an "angel wing". A nozzle plenum 45 is defined between the forward and aft flanges 40 and 42.

Figure 2:
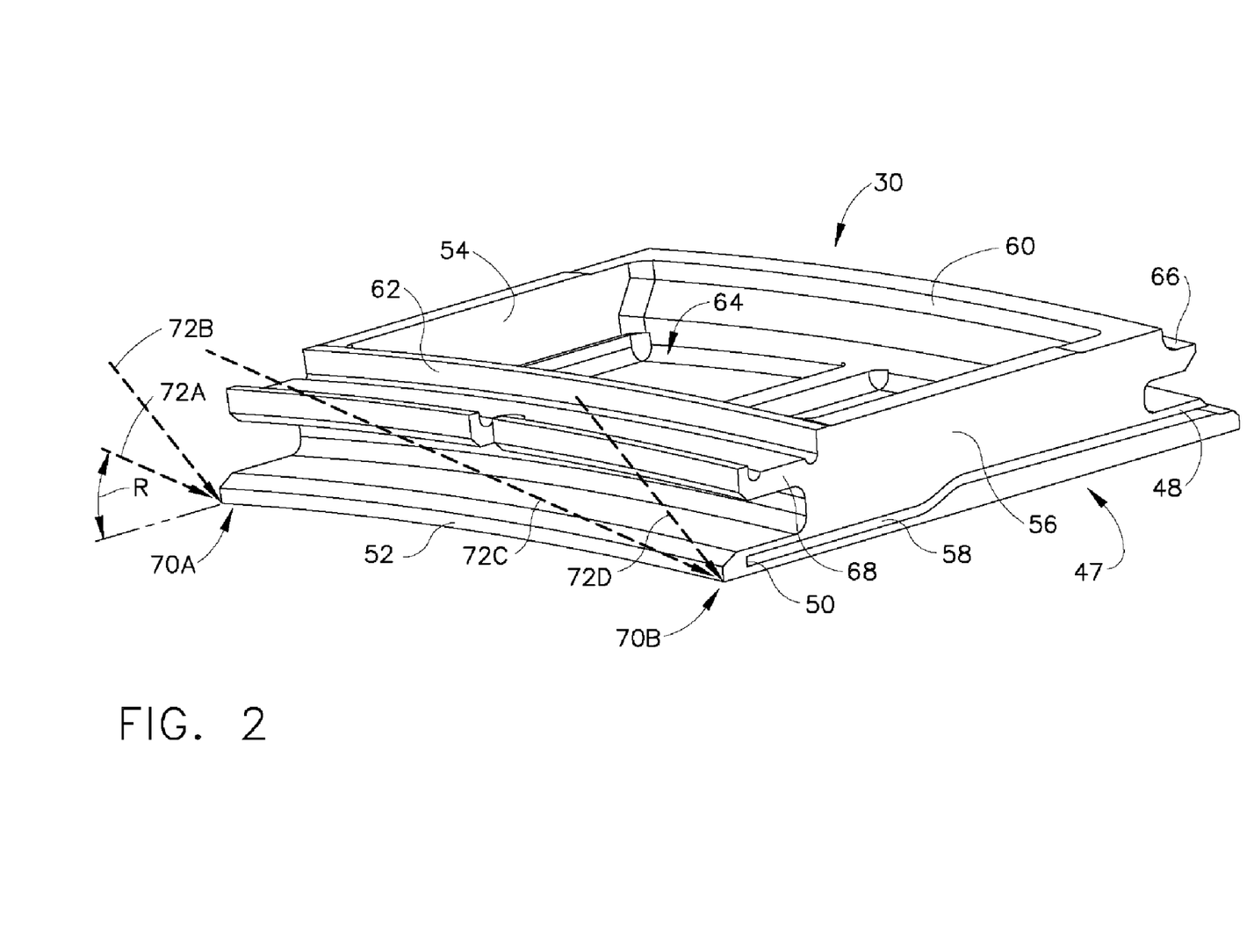
FIG. 2 is a perspective view of an exemplary shroud segment constructed according to the present invention.
Figure 6:
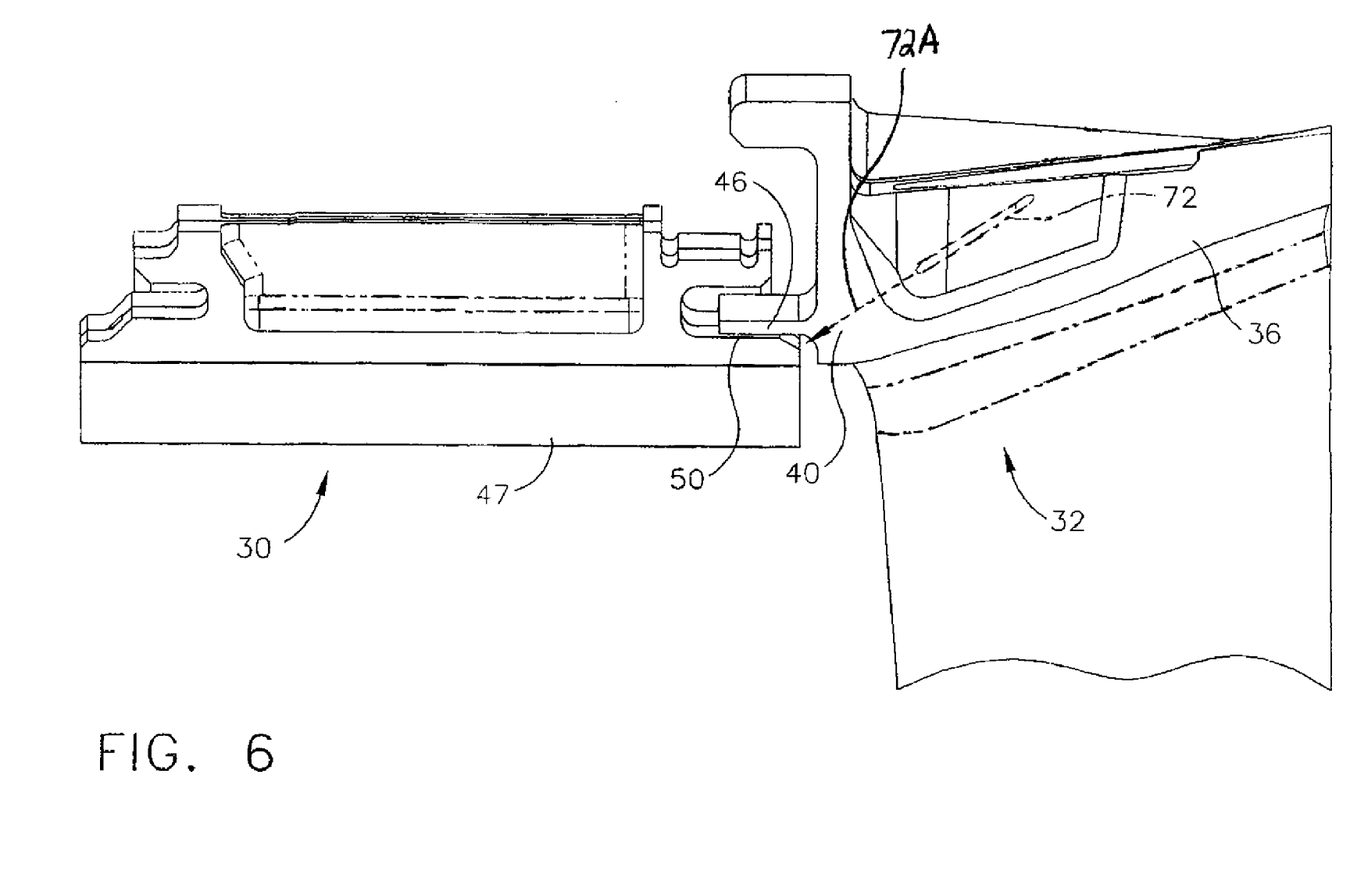
FIG. 6 is a cross-sectional view of a portion of a turbine nozzle segment and an associated shroud segment.

FIG. 2 shows one of the shroud segments 30 in more detail. The shroud segment 30 is generally arcuate in shape and has a flowpath surface 47, a forward flange 48, an aft flange 50 defining an axially-facing aft edge 52, and opposed side walls 54 and 56. The side walls 54 and 56 may include seal slots 58 for receiving end seals of known type (not shown) to prevent leakage between adjacent shroud segments 30. The shroud segment 30 includes an outwardly-extending forward wall 60 and an outwardly-extending aft wall 62. The forward wall 60, aft wall 62, and side walls 54 and 56 cooperate to form an open shroud plenum 64. A forward mounting rail 66 extends from the forward wall 60, and an aft mounting rail 68 extends from the aft wall 62. When installed, the upper surface of the aft flange 50 interacts with the discourager lip 46 of the second-stage nozzle segment 32 to minimize flowpath gas leakage, as shown in FIG. 6.

The shroud segment 30 may be formed as a one-piece casting of a suitable superalloy, such as a nickel-based superalloy, which has acceptable strength at the elevated temperatures of operation in a gas turbine engine. At least the flowpath surface 47 of the shroud segment 30 may be provided with a protective coating such as an environmentally resistant coating, or a thermal barrier coating ("TBC"), or both.

The shroud segment 30, and particularly the outer aft corners 70A and 70B thereof, are subject to high temperature gas flows which may cause localized oxidation and "burning" or erosion of the aft flange 50 and aft edge 52. Prior art shroud segments may be provided with cooling holes (not shown) disposed in fluid communication with a source of cooling air and arranged to provided localized cooling to the outer aft corners 70A and 70B. Unfortunately, a "bow wave" flow structure generated by air flowing past the aft-positioned airfoil 34 disturbs the air flow in the vicinity of the aft edge 52, which can cause localized "hot spots" if the shroud segment 30 is uncooled, or can render the intended localized cooling ineffective. Furthermore, drilling cooling holes in certain kinds of TBCs can cause cracking or detachment thereof, making them intrinsically incompatible with cooling. Accordingly, the shroud segment 30 of the present invention is substantially free from any film cooling holes directed at the aft flange 50 or the aft edge 52.

Figure 3:
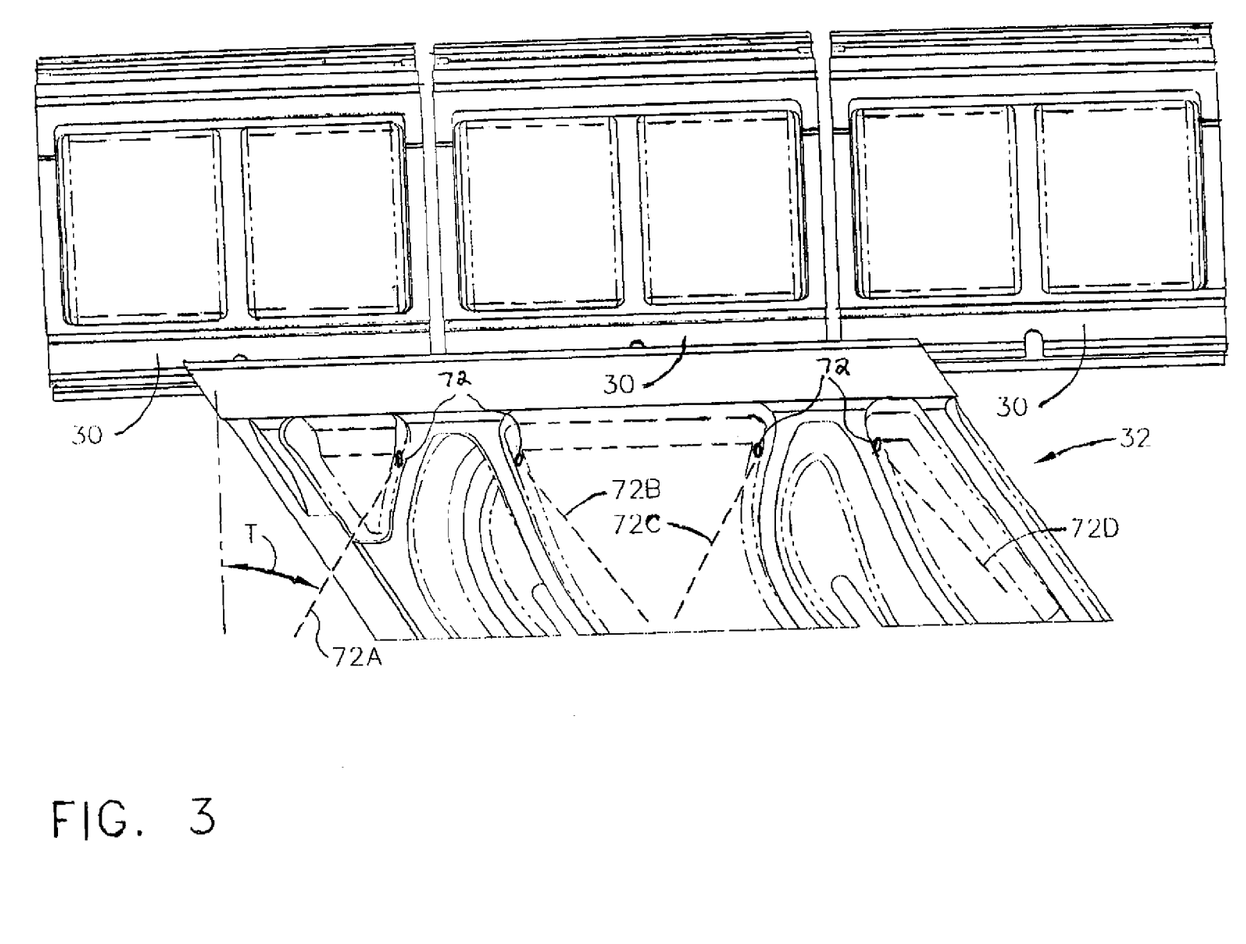
FIG. 3 is a top view of the shroud segment of FIG. 2 and a downstream nozzle segment.
Figure 4:
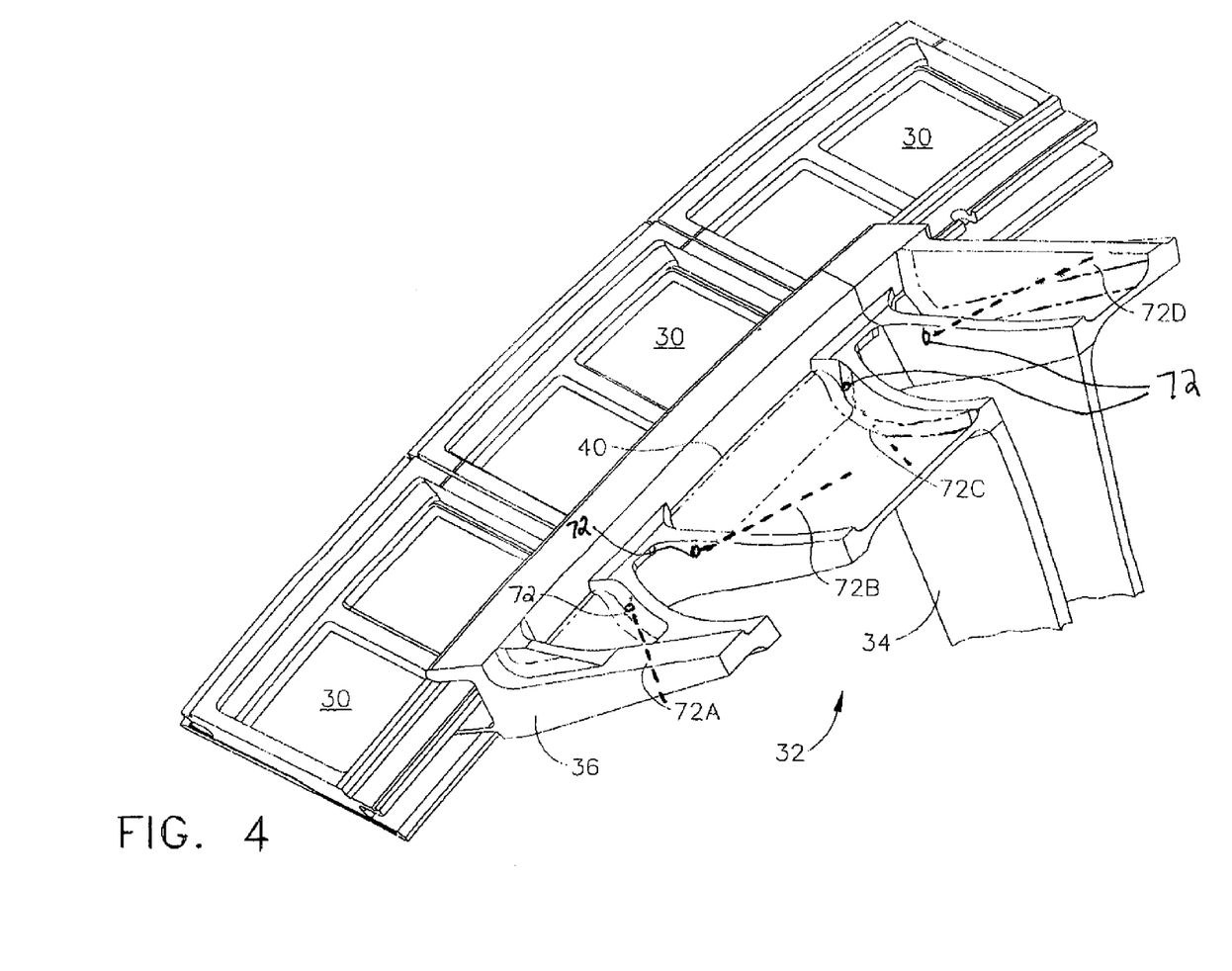
FIG. 4 is a partial perspective view of a turbine nozzle segment and an associated shroud segment.
Figure 5:
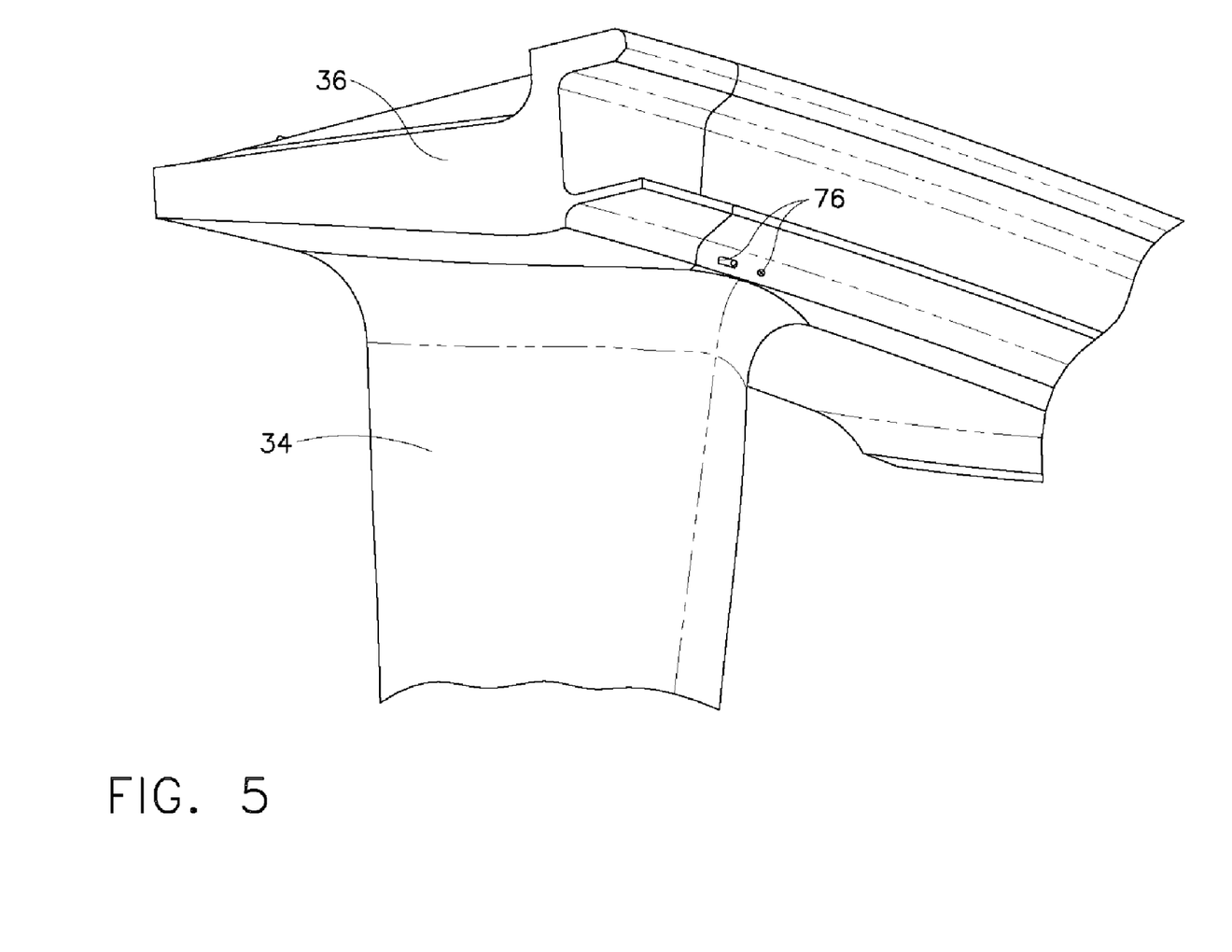
FIG. 5 is a partial perspective view of a turbine nozzle segment.

FIGS. 4 and 5 show the nozzle segment 32 in more detail. One or more cooling holes 72 are formed in the outer band 36. These cooling holes 72 are strategically positioned and oriented such that they negate the "bow wave" effect on the aft edge 52 of the shroud segment 30. In this example, the cooling holes 72 have a diameter of about 0.61 mm (0.024 in.). Each of the cooling holes 72 passes through the forward flange 40 and has an inlet disposed in fluid communication with the nozzle plenum 45 (see FIG. 1), and an outlet 76 disposed in fluid communication with the shroud segment 30. For illustrative purposes only, FIGS. 2 and 3 show the centerline axes of the various cooling holes 72, which are depicted by arrows for clarity. Each of four cooling hole centerline axes 72A, 72B, 72C and 72D, respectively are angled in a radial plane towards the centerline axis "C" of the HPT 10 (see FIG. 1), as illustrated by the angle marked "R" relative to the first cooling hole centerline axes 72A. Each of the cooling holes 72 is also angled in a tangential plane, as illustrated by the angle "T" marked relative to the first cooling hole centerline axis 72A in FIG. 3. In other words, each of the cooling holes is angled to the "left" or "right" of the centerline axis in a circumferential direction. The specific angle varies for each cooling hole 72 centerline axis. The angles will depend upon the particular application. Generally the angle "R" will be about 32 degrees to about 35 degrees, while the angle "T" will be from about 49 degrees to about 51 degrees.

In the illustrated example, the first and third cooling holes 72A and 72C are angled to the right in a tangential plane, as viewed from an aft-looking-forward direction, and the second and fourth cooling holes 72B and 72D are angled to the left in a tangential plane, as viewed from an aft-looking-forward direction.

In operation, relatively low-temperature coolant is supplied in a known manner to the nozzle plenum 45 of the second stage nozzle 28. For example, compressor discharge air may be used for this purpose. The cooling air passes through the cooling holes 72 in the forward flange 40 of the outer band 36, as shown in FIG. 6. It then exits the cooling holes 72 and impinges on the aft edge 52 of the shroud segment 30, in particular the outer aft corners 70A and 70B. The spent cooling air then enters the primary gas flowpath "F". This cooling flow is highly localized and tends to negate any localized heating or loss in back-flow margin caused by the "bow wave" over the airfoil 34. Thus, effective protection is provided to the shroud segment without excessive total cooling flow. In some configurations, the negation of "bow wave" heating of localized portions of the shroud segment 30 may allow it to operate without cooling of the aft flange 50 thereof.

The foregoing has described a cooled shroud assembly for a gas turbine engine. While specific embodiments of the present invention have been described, it will be apparent to those skilled in the art that various modifications thereto can be made without departing from the spirit and scope of the invention. For example, while the present invention is described above in detail with respect to a first stage shroud segment 30 and an aft-mounted nozzle 28, a similar structure could be incorporated into other parts of the turbine. Accordingly, the foregoing description of the preferred embodiment of the invention and the best mode for practicing the invention are provided for the purpose of illustration only and not for the purpose of limitation, the invention being defined by the claims.

What is claimed is:

1. A cooled shroud assembly for a gas turbine engine having a longitudinal centerline, said shroud assembly comprising:

at least one arcuate shroud segment surrounding a row of rotating turbine blades, said shroud segment having a forward flange, an aft flange defining an axially-facing aft edge, and an inwardly-facing flowpath surface, wherein said shroud segment lacks cooling holes for cooling said aft flange; and at least one stationary turbine nozzle disposed axially next to said shroud segment, comprising:

an airfoil; and an arcuate outer band disposed at a radially outer end of said airfoil and positioned axially adjacent to said shroud;

wherein a plurality of cooling holes including at least a first cooling hole and at least a second cooling hole are formed in said outer band and in fluid communication with a source of cooling air, said first cooling hole and said second cooling hole being positioned so as to impinge a flow of cooling air against said shroud segment and such that said first cooling hole and said second cooling hole converge at about the same place on said shroud segment.

2. The shroud assembly of claim 1 wherein at least one cooling hole of said plurality of cooling holes is oriented so as to impinge a flow of cooling air directly against said axially-facing aft edge of said shroud segment.

3. The shroud assembly of claim 2 wherein the at least one cooling hole of the plurality of cooling holes is disposed at an angle R in a radial plane towards said centerline axis.

4. The shroud assembly of claim 3 wherein said angle R is about 32 to about 36 degrees.

5. The shroud assembly of claim 2 wherein the at least one cooling hole of said plurality of cooling holes is disposed at an angle T in a tangential plane to direct a flow of cooling air at an outer aft corner of said shroud segment.

6. The shroud assembly of claim 5 wherein said angle T is about 48 to about 58 degrees.

7. The shroud assembly of claim 2 wherein the at least one cooling hole of said plurality of cooling holes is positioned so as to direct a flow of cooling air against a selected portion of an adjacent shroud segment.

8. A method of cooling a shroud for a gas turbine engine comprising:
    providing at least one arcuate shroud segment surrounding a row of rotating turbine blades, said shroud segment having a forward end, an aft flange defining an aft edge, and an inwardly-facing flowpath surface, wherein said aft flange lacks cooling holes;
    providing at least one stationary turbine nozzle disposed axially next to said shroud segment, said nozzle including:
    an airfoil;
    an arcuate outer band disposed at a radially outer end of said airfoil and disposed axially next to said shroud, said outer band defining a nozzle plenum, wherein gas flow over said airfoil generates a bow wave which causes localized heating of a portion of said aft flange;
    directing a flow of cooling air from said nozzle plenum to said aft edge of said shroud segment so as to substantially negate said localized heating; and
    forming a plurality of cooling holes including at least a first cooling hole and at least a second cooling hole in said shroud and having an inlet in fluid communication with said nozzle and an outlet in fluid communication with said aft edge, wherein said first cooling hole and said second cooling hole converge at about the same place on said shroud segment.

9. The method of claim 8 wherein at least one cooling hole of said plurality of cooling holes is oriented so as to direct a flow of cooling air directly against a selected portion of said aft end of said shroud segment.

10. The method of claim 9 wherein the at least one cooling hole of said plurality of cooling holes is disposed at an angle R in a radial plane towards said longitudinal axis.

11. The method of claim 10 wherein said angle R is about 32 to about 36 degrees.

12. The method of claim 11 wherein the at least one cooling hole of said plurality of cooling holes is disposed at an angle T in a tangential plane so as to direct a flow of cooling air at an outer aft corner of said shroud segment.

13. The method of claim 12 wherein said angle T is about 48 to about 58 degrees.

14. A cooled shroud assembly for a gas turbine engine having a longitudinal centerline, said shroud assembly comprising:
    at least one arcuate shroud segment surrounding a row of rotating turbine blades, said shroud segment having a forward flange, an aft flange defining an axially-facing aft edge, and an inwardly-facing flowpath surface, wherein said shroud segment lacks cooling holes for cooling said aft flange; and
    at least one stationary turbine nozzle disposed axially next to said shroud segment, comprising:
    an airfoil; and
    an arcuate outer band disposed at a radially outer end of said airfoil and positioned axially adjacent to said shroud;
    wherein a plurality of cooling holes including at least a first cooling hole and at least a second cooling hole are formed in said outer band and in fluid communication with a source of cooling air, said first cooling hole and said second cooling hole being positioned so as to impinge a flow of cooling air on the aft flange of the shroud segment.

15. The shroud assembly of claim 14 wherein at least one cooling hole of said plurality of cooling holes is disposed at an angle R in a radial plane towards said centerline axis.

16. The shroud assembly of claim 15 wherein said angle R is about 32 to about 36 degrees.

17. The shroud assembly of claim 14 wherein the at least one cooling hole of said plurality of cooling holes is disposed at an angle T in a tangential plane to direct a flow of cooling air at an outer aft corner of said shroud segment.

18. The shroud assembly of claim 17 wherein said angle T is about 48 to about 58 degrees.

* * * * *

UNITED STATES PATENT AND TRADEMARK OFFICE
CERTIFICATE OF CORRECTION

PATENT NO.      : 7,588,412 B2                                            Page 1 of 1
APPLICATION NO. : 11/161275
DATED           : September 15, 2009
INVENTOR(S)     : Nichols et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 816 days.

Signed and Sealed this

Twenty-first Day of September, 2010

David J. Kappos
*Director of the United States Patent and Trademark Office*